United States Patent
Lutz

Patent Number: 5,308,283
Date of Patent: May 3, 1994

[54] JOINT FOR CARDAN SHAFTS

[75] Inventor: Christian Lutz, Nüziders, Austria

[73] Assignee: Etablissement Supervis, Vaduz, Liechtenstein

[21] Appl. No.: 820,093

[22] Filed: Jan. 13, 1992

[30] Foreign Application Priority Data

Jan. 29, 1991 [DE] Fed. Rep. of Germany ....... 4102515

[51] Int. Cl.⁵ .......................... F16D 3/40; B62D 1/16
[52] U.S. Cl. ...................................................... 464/136
[58] Field of Search ............... 464/112, 134, 136, 178, 464/132, 133, 130, 128, 131

[56] References Cited

U.S. PATENT DOCUMENTS

| | | | |
|---|---|---|---|
| 1,141,211 | 6/1915 | Prescott | 464/136 X |
| 1,386,735 | 8/1921 | Schaefer | 464/136 X |
| 2,207,981 | 7/1940 | Greiner | 464/112 |
| 2,271,974 | 2/1942 | Greiner | 464/178 X |
| 2,331,982 | 10/1943 | Johnson | 464/178 X |
| 2,976,703 | 3/1961 | Atkinson | 464/178 X |
| 3,828,578 | 8/1974 | Herscovici | 464/136 X |
| 4,498,888 | 2/1985 | Pastor | 464/136 X |

*Primary Examiner*—Daniel P. Stodola
*Attorney, Agent, or Firm*—Anderson Kill Olick & Oshinsky

[57] ABSTRACT

A joint is provided for cardan shafts, as are for instance, utilized in steering columns of motor vehicles and includes a trunnion cross provided as a coupling member, the axis length of the one pair of trunnions of this trunnion cross being larger than the axis length of the other trunnion pair, the trunnion pair having the greater axis length being supported in the end of one shaft configured as a bell-shaped joint part, while the trunnion pair having the smaller axis length on the hand is received by the arms of a fork, forming the end of the other shaft. The ratio of the lengths of the lever arms, on which the computation of the arising forces and moments is based, is only slightly greater than one, and the outer side of the bell or tulip shaped joint part is set off in a step like manner for receiving and/or abutting a bearing or a bearing ring. The center point of the joint lies in or closely to the central plane of the bearing or bearing ring received by the bell-shaped joint part.

1 Claim, 2 Drawing Sheets

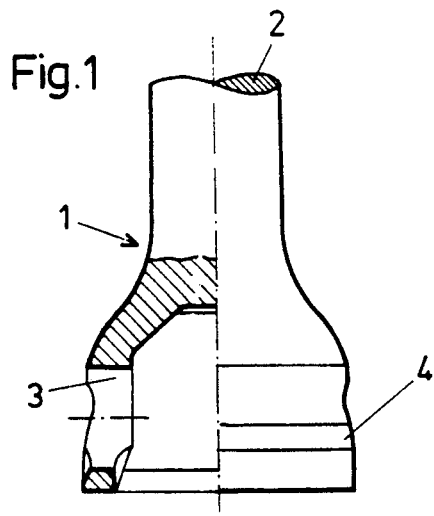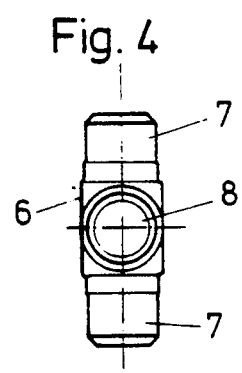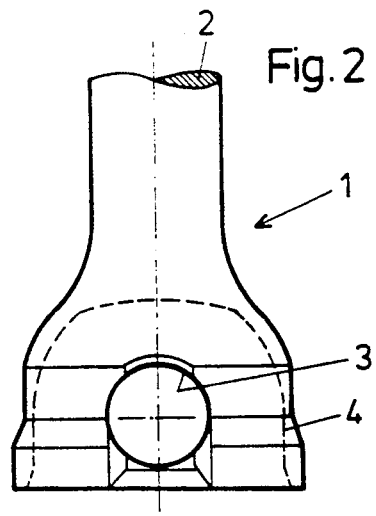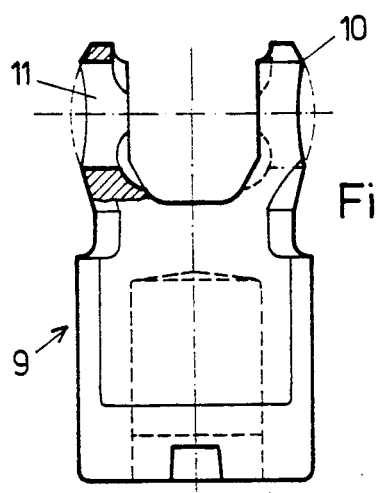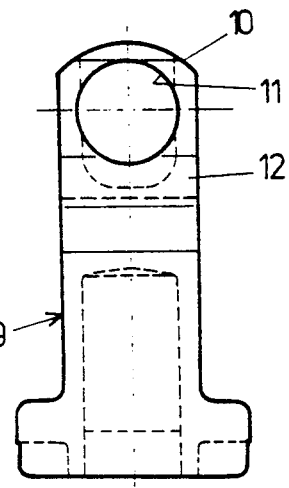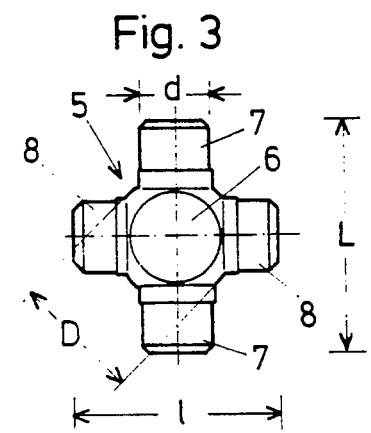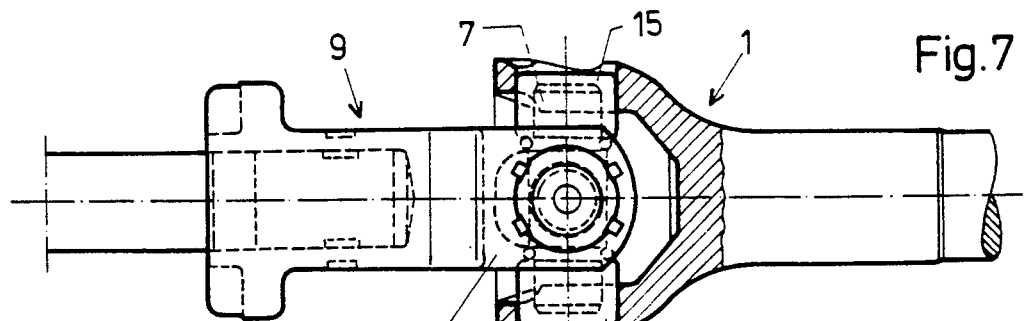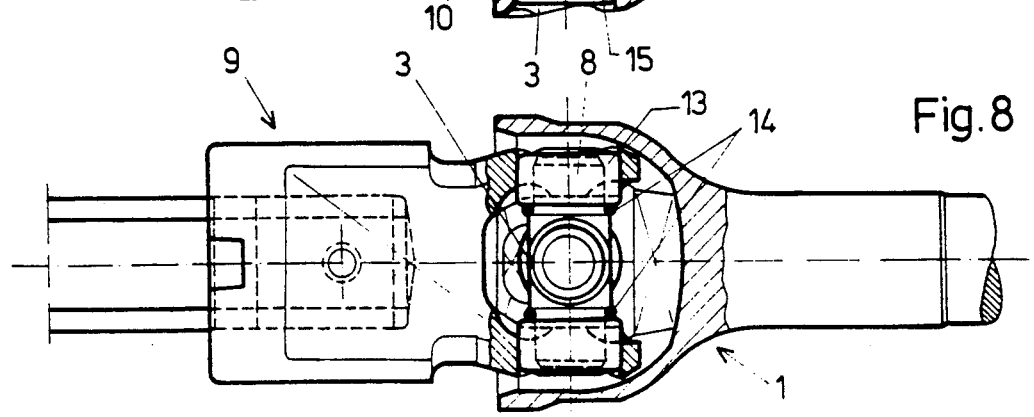

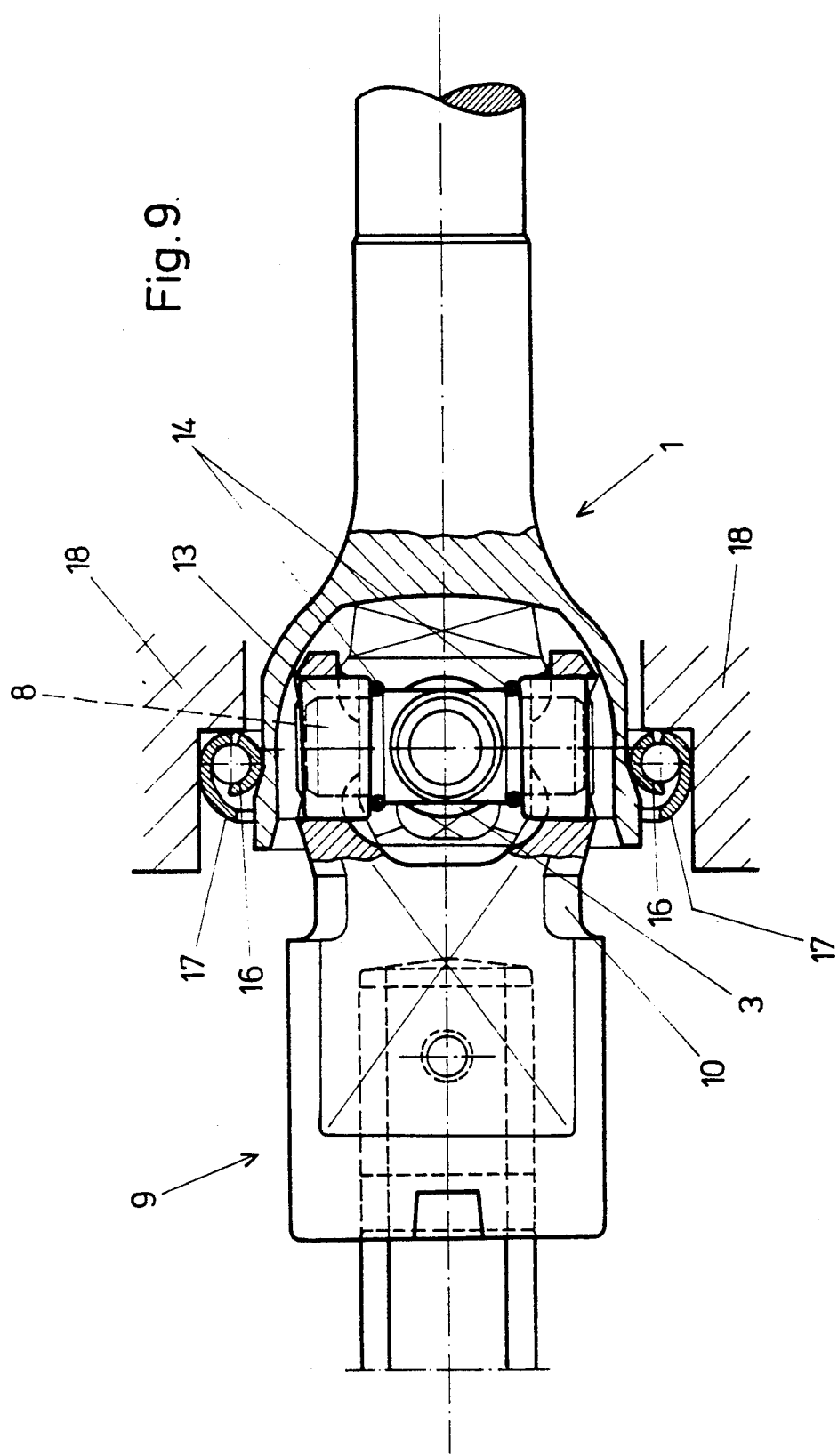

JOINT FOR CARDAN SHAFTS

BACKGROUND OF THE INVENTION

The invention is directed to a joint for cardan shafts, for instance for steering columns of motor vehicles, which shafts have a coupling member configured as a cross pin or a trunnion cross, whose trunnions are rotationally supported in pairs in the end of the two shafts, at least one end of a shaft being configured as a fork.

In this connection, the joint for cardan shafts in the U.S. Pat. No. 2,271,974 must be mentioned. The end of the one shaft is configured to be bell or tulip shaped. A trunnion passing transversely through this joint part and forming a coupling member is supported in this joint part with a widened central portion comprising a central recess, at which central portion bearing bushes with their axes aligned diametrically with respect to each other are shaped or formed on. These bearing bushes are on the external side of the central portion and are offset through 90° with respect to the trunnion axis. The bearing bushes accept a bolt passing through the central recess in the trunnion. The end of the other shaft projects into the central recess of the trunnion, with the shaft having a transverse bore penetrated by the central segment of the bolt. In the bell-like joint part, incisions emanate from its edge at diametrically opposite points, which incisions then widen in a keyhole-like manner. These incisions serve for receiving the trunnion as a coupling member. The width of these incisions corresponds to the diameter of the trunnion serving as a coupling member and the diameter of the adjacent widening corresponds to the external diameter of the housings of the needle roller bearings, which receive the ends of this trunnion. The housings of the needle roller bearings are fixed respectively by means of a lock screw. The coupling member used here is manufactured by machining or metal cutting. This known joint is impractical for a number of reasons, including those discussed below.

The fabrication of the coupling member by machining is too expensive for a mass produced article. Not only the central bore must be produced for receiving the end segments of the one shaft, but also the bores in the bearing bushes for receiving the transverse bolt. The incisions emanating from the edge of the bell-like joint portion, into which the trunnions of the coupling member are pushed during assembly of the joint, weaken this construction part to a considerable extent. Above all, however, the lever arms serving for the force and a moment transmittal for the one end segment of the one shaft protruding into the central recess of the coupling member are as unfavorable as can be imagined when compared to the lever length for the other shaft segment. Forces or moments which can be transmitted by a joint are determined by the load carrying capacity of the weakest link in the joint. Assuming the most unfavorable case for the lever arms on which the computation of the occurring forces and moments are based, namely that the trunnions or the bore carry load only at their outer end, then the length ratio of the two lever arms in this case amounts to approximately 4 to 1.5. Furthermore, it has to be remembered that the bearing carrying the one shaft is arranged on the side of the bell-shaped joint part, so that a not inconsiderable distance exists between the center of the joint and the mentioned shaft bearing, which favors the occurrence of bending loads.

A comparable design is known from the U.S. Pat. No. 1,003,017. Compared to the initially discussed design we are dealing here with an improved solution, since in this case the coupling member is designed as a single piece cross pin or as a single piece trunnion cross. Statements about the type of bearing arrangement in support of the shaft can, however, not be discerned from this publication. This also applies to the cardan shaft in DE-OS 28 18 167, which joint part proper is designed in a similar manner.

A steering shaft is also known from U.S. Pat. No. 4,608,891, which shaft is supported in a shaft tube and whose one end is configured as a fork of a joint, which is not disclosed in greater detail. A ball bearing is provided in the transitional region between the fork and the shaft. A comparable design is also shown in DE-OS 38 11 215. In both cases, the shaft is supported externally of its joint, so that a not inconsiderable distance exists between the center of the joint and the respective shaft bearing, which favors the occurrence of additional bending loads in the joint region, where, in any case high forces already exist for transmitting the torques.

SUMMARY OF THE INVENTION

The invention proceeds from the state of the art and aims to improve and design a joint of the above-mentioned type so that not only the fabrication cost is considerably reduced, but also the loading conditions of the joint are made to be more favorable, in addition to care being taken to design the joint to occupy the least possible space, so that as large a torque share is possible can be transmitted per unit volume of the joint. In the invention this is achieved by a joint having the combination of the following features. The end of the one shaft is configured as a bell or tulip shaped joint portion. The one trunnion pair of the trunnion cross is supported in the bell or tulip shaped joint portion of the one shaft. The two trunnion pairs have unequal axis lengths. The fork at the end of the other shaft is connected to a trunnion pair with the short axis length. The outer side of the bell or tulip shaped joint part is set off in a step shaped manner for receiving and/or abutting of a bearing or bearing ring. The center point of the joint lies in or close to the central plane of the bearing or bearing ring received by the joint part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 1 and 2 are two views of the bell-shaped joint portion partially cut open;

FIG. 3 is a front view of the trunnion cross;

FIG. 4 is a side view of the trunnion cross;

FIG. 5 is a front view (partially cut open) of the fork-shaped end of the one shaft;

FIG. 6 is a side view of the fork-shaped end of the one shaft;

FIGS. 7 and 8 are two longitudinal sections relatively offset through 90° to each other through the assembled and finish-installed joint; and FIG. 9 is a picture of the shaft as in FIG. 8, however, together with its bearing.

DETAILED DESCRIPTION OF THE PREFERRED EMBODIMENTS

FIGS. 1 and 2 show a joint part 1 widened in a bell or tulip-shaped manner, which forms the end segment of one shaft 2. The bores 3 with closed circumferences are provided at diametrically opposite points and serve for receiving needle roller bearings. At least portions of the external edge of the bores 3 are flattened. The outer side of this joint part 1 has a step-like shoulder 4 which is provided for receiving or abutting a bearing or bearing ring.

A trunnion cross 5 is shown in FIGS. 3 and 4, and is manufactured in an extrusion process. The trunnion cross 5 has a central portion 6 and two pairs of trunnions 7, 8 which stand cross-like and at right angles to each other. The trunnions of the pairs of trunnions preferably have the same diameter. The length of the axis L of one pair of trunnions 7 is, however, greater than the length of the axis 1 of the other pair of trunnions 8. The ratio of the diameters D of the central portion 6 of the trunnion cross 5 to the diameter d of the trunnions of the pairs of trunnions 7, 8 amounts to approximately 1.5.

The end segment of the other shaft 9 is designed as a fork, wherein the arms forming the fork comprise bores 11. The outer sides 12 of the arms 10 of the fork are spherical surfaces, whose radii correspond to approximately half the external width of the fork. The envelope curve of this spherical surface is indicated by a broken dotted line in FIG. 5.

FIGS. 7 and 8 show the finish-assembled joint in two longitudinal sections offset to each other through 90°, which joint is built up of the previously discussed parts. For assembly, the trunnion cross 5 is inserted with its short pair of trunnions 8 into the bores 11 of the end segment of the shaft 9. The diameters of the bore 11 are larger than those of the trunnions 8 and subsequently needle roller bearings 13 with their housings are pressed in from outside. Also, O-rings 14 are provided as seals for the needle roller bearings. The external edges of the bores 11 are peened over from outside and thus the needle roller bearings 13 with their housings are immobilized or fixed. Now the end segment of the shaft 9 with the already inserted trunnion cross 5 is placed into the other joint part 1, by sliding the trunnions of the other pair of trunnions 7 into the bores 3. Subsequently, needle roller bearings 15 with their housings are also pressed in from outside. Here also the outer edges of the bores are peened over in order to fix the needle roller bearings 15 with their housings. Now the joint is assembled and ready to operate.

When assembling the shaft into a steering column, the shaft bearing is slid upon the bell-like joint part 1 and rests at its external shoulder 4. If small ridges or burrs were formed at the edge of the bores 3 during the peening process of the needle roller bearings 15 or their housings, these do not impair this pushing in process of the shaft bearing, since at least the segments of the outer edges of the bores 3 are designed to be flattened, at which bores the peening process is accomplished so that finally no burrs or ridges formed during the peening process are located within the envelope circle of the corresponding cross-section of the bell-shaped joint part 1.

FIG. 9 shows the shaft together with its bearing arrangement. An inner ball bearing ring 16 of a ball bearing is pushed over the step like shoulder 4, whose outer ring 17 rests at the housing or chassis 18 which is not shown here. It is discernible and recognizable from this illustration in FIG. 9, that the center of the joint lies in or close to the central plane of the bearing or bearing ring 16, 17 received in the bell-shaped joint portion 1, wherein particularly favorable bearing conditions are achieved since thereby the joint itself is hardly exposed to the bearing forces.

One therefore tries to have the central plane of the bearing and the center point of the joint coincide as closely as possible, so that the shaft and joint are exposed to favorable loading conditions during actual operation. The housings of the needle roller bearings 13 and 15 are dimensioned and used in such a way that they do not project beyond the circumferential contour of the construction parts receiving them, so that neither the reception of the external bearing nor the mobility of the fork at maximum axis length 1 of the trunnion pair 8 are impaired within the bell-shaped joint part 1. Thus, high torques can be transmitted, since the ratio of the lengths of the lever arms on which the calculation of the arising forces and moments is based, is extremely favorable achieving the highest attainable value.

While the invention has been illustrated and described as embodied in a joint for cardan shafts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand-point of prior art, fairly constitute essential characteristics of the generic or specific aspects of this invention.

What is claimed as new and desired to be protected by letters patent is set forth in the appended claims.

1. Joint for cardan shafts, for steering columns in motor vehicles, comprising:
   a trunnion cross (5) as a coupling link including a first pair of trunnions (7) whose entire longitudinal length is a first length (L) and a second pair of trunnions (8) whose entire longitudinal length is a second length (1), the first length (L) being greater than the second length (1);
   wherein an end of a shaft (9) is configured as a fork, where the second trunnion pair (8) is rotatably supported and wherein an end of another shaft (2) is configured as a bell-shaped joint part (1), where the first trunnion pair (7) is rotatably supported, characterized in that the external surface of the bell-shaped joint part (1) is set off in a step-like manner for receiving or contacting a bearing such that the center point of the bell-shaped joint part (1) is located close to the central plane of the bearing received by the bell-shaped joint part (1).

* * * * *